United States Patent
Bergen et al.

(10) Patent No.: US 9,651,430 B2
(45) Date of Patent: May 16, 2017

(54) METHOD AND DEVICE FOR DETECTING AT LEAST ONE PULSED LIGHT SOURCE FOR A VEHICLE

(71) Applicant: Robert Bosch GmbH, Stuttgart (DE)

(72) Inventors: Lothar Bergen, Gerlingen (DE); Paul Ruhnau, Leonberg-Hoefingen (DE)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 14/423,973

(22) PCT Filed: Aug. 26, 2013

(86) PCT No.: PCT/EP2013/067635
§ 371 (c)(1),
(2) Date: Feb. 25, 2015

(87) PCT Pub. No.: WO2014/040848
PCT Pub. Date: Mar. 20, 2014

(65) Prior Publication Data
US 2015/0253198 A1  Sep. 10, 2015

(30) Foreign Application Priority Data
Sep. 11, 2012  (DE) .................. 10 2012 216 065

(51) Int. Cl.
*G01C 21/24* (2006.01)
*G01J 11/00* (2006.01)
(Continued)

(52) U.S. Cl.
CPC ................ *G01J 11/00* (2013.01); *G01J 1/42* (2013.01); *G06K 9/00825* (2013.01);
(Continued)

(58) Field of Classification Search
CPC ........ G06K 9/00825; G01J 2001/4238; H04N 5/2357
See application file for complete search history.

(56) References Cited

U.S. PATENT DOCUMENTS

2011/0317028 A1* 12/2011 Shinmei .............. H04N 5/2355
348/223.1
2013/0229521 A1*  9/2013 Siecke ............... G06K 9/00825
348/148

FOREIGN PATENT DOCUMENTS

DE            19644479        5/1998
DE      10 2008 023 853      12/2009
(Continued)

OTHER PUBLICATIONS

International Search Report for PCT/EP2013/067635, issued on Nov. 11, 2013.

*Primary Examiner* — Thanh Luu
(74) *Attorney, Agent, or Firm* — Norton Rose Fulbright US LLP (57) ABSTRACT

For detecting at least one pulsed light source, light emitted by the pulsed light source being detected by a detector unit, a method includes detecting a first image parameter of the light of the light source using a first exposure time; detecting at least a second image parameter of the light of the light source using an at least second exposure time, the first exposure time and the at least second exposure time being different, and the detector unit being set to a predetermined value between the detection of the first image parameter and the detection of the at least second image parameter, the first image parameter and the at least second image parameter chronologically consecutively representing the same spatial location; and evaluating the at least second image parameter to detect a pulsed light source when at least the at least second image parameter meets a predetermined criterion.

10 Claims, 5 Drawing Sheets

(51) Int. Cl.
*G06K 9/00* (2006.01)
*H04N 5/355* (2011.01)
*G01J 1/42* (2006.01)
*H04N 5/232* (2006.01)

(52) U.S. Cl.
CPC ..... *H04N 5/23216* (2013.01); *H04N 5/23219* (2013.01); *H04N 5/35581* (2013.01); *G01J 2001/4238* (2013.01)

(56) References Cited

FOREIGN PATENT DOCUMENTS

| | | |
|---|---|---|
| DE | 10 2010 003 668 | 10/2011 |
| WO | WO 2012/019700 | 2/2012 |

\* cited by examiner

METHOD AND DEVICE FOR DETECTING AT LEAST ONE PULSED LIGHT SOURCE FOR A VEHICLE

FIELD OF THE INVENTION

The present invention relates to a method for detecting at least one pulsed light source for a vehicle, a corresponding device, and a corresponding computer program product.

BACKGROUND

In road traffic, pulsed light sources, in particular periodically pulsed light sources, may be found as variable message signs, tail lights, or turn signals of vehicles, for example. Driver assistance systems, anticipatory sensor systems, or other imaging methods for a vehicle record the vehicle surroundings in order to further utilize information gained therefrom. Pulsed light sources pose a particular challenge in this. In the automotive field and many other fields, a high dynamic range is expected of cameras to ensure that the associated image processing algorithms function well even in difficult lighting situations, such as at tunnel entrances and tunnel exits, for example. For this reason, cameras having piecewise linear characteristic curves are frequently used. These piecewise linear characteristic curves allow a higher dynamic range to be depicted since the image goes into saturation later, because higher light intensities in the real space environment are more strongly compressed in the recorded image. As an alternative to this, every pixel is exposed within an exposure cycle directly consecutively using three different integration times, for example. The final gray scale value in the latter camera type is usually determined on every pixel by selecting the first non-saturated output voltage of a pixel. The integration time of the pixel, together with the output voltage, then results in the final gray scale value.

The unexamined patent application DE 10 2008 023853 A1 introduces a method for detecting an object, in which at least one light source of the object is illuminated in a pulsed manner, the light emitted by the light source is detectable by a detector unit, and the object is detected as a function of the detection of the light, a multiple exposure for generating an image being carried out by the detector unit to detect the light of the light source, and the total time duration of an exposure process having multiple exposures being set to be greater than the time duration of an off phase of the light source during a period duration of the light of the light source, which is emitted in a pulsed manner.

SUMMARY

Against this background, the present invention introduces a method for detecting at least one pulsed light source for a vehicle, a device that uses this method, and a corresponding computer program product.

To be able to record a high dynamic range, cameras with piecewise linear characteristic curves and camera systems that record an image series, i.e., at least two images, using different exposure times, are used. As a result of a pulsed light source, characteristics in the recorded image and/or during the creation of the recorded image are able to provide information about the pulsed light source. Cameras with piecewise linear characteristic curves and camera systems that record an image series, i.e., at least two images, using different exposure times, reset the detector unit or the camera sensor to a predefined value between the at least two recorded images, with the difference that a camera with a piecewise linear characteristic curve is set to a predefined value between the minimal and the maximal (voltage) value, and in the other camera systems the predefined value may be the minimal and/or the maximal (voltage) value(s).

An example embodiment of the present invention is directed to a method for detecting at least one pulsed light source, the light emitted by the pulsed light source being detected by a detector unit, the method including: detecting a first image parameter of the light of the light source using a first exposure time; detecting at least a second image parameter of the light of the light source using an at least second exposure time, the first exposure time and the at least second exposure time being different, and the detector unit being set to a predetermined value between the detection of the first image parameter and the detection of the at least second image parameter, the first image parameter and the at least second image parameter chronologically consecutively representing the same spatial location; and evaluating the at least second image parameter to detect a pulsed light source when at least the at least second image parameter meets a predetermined criterion.

A detector unit is able to detect light of a light source. The detector unit can be a sensor, for example, an imaging sensor. The sensor can be designed, for example, as a charge-coupled device (CCD) and/or complementary metal-oxide semiconductor (CMOS) sensor. The detector unit can include a plurality of pixels. The detector unit can be a camera or a camera system. The detector unit can be understood to mean an imager. The detector unit is able to create a depiction of the surroundings. The detector unit can include at least one filter. The detector unit can be installed in a vehicle, the vehicle being a motor vehicle such as a passenger car, a motorcycle, and/or a commercial vehicle. The light source can actively emit light and/or reflect incident light. The light source can be a pulsed light source. A pulsed light source can be a light emitting diode (LED), which emits light in temporally limited pulses. The activation duration of the pulsed light source can vary. An image parameter can represent an image point detected by the detector unit. An image parameter can be referred to as a pixel, a value of which being detectable, the value representing a gray scale value, an intensity, a color shade, a color value, a color saturation, a lightness value, a brightness, and/or a light intensity. An exposure time can be understood to mean a time duration and/or a time period in which the detector unit is exposed to the light to record an image parameter. The detector unit can be reset to a predetermined value, in particular prior to an exposure with a predetermined exposure time. It is possible to reset only individual parts to a predetermined value, in particular in a rule-based manner. When an image parameter exceeds and/or drops below a predetermined value, the detector unit can set the part of the detector unit, for example a pixel of the detector unit, to a predetermined value. The predetermined value may also correspond to the value of the detector unit at the beginning of the first exposure. This may also be referred to as a full reset. A first image parameter and a second image parameter can chronologically consecutively represent the same spatial location, in particular using a different exposure time. The first image parameter and the second image parameter can be detected by the same pixel of the detector unit. The detector unit can be reset to a predetermined value between the detection of the first image parameter and of the second image parameter. The detection of the light of the light source using different exposure times can result in relatively different values for the first image parameter and the second image parameter. In an example embodiment, with a very short exposure time during the detection of the second image parameter, only the dark phase of a pulsed light source is detected. These phenomena in the detection of a pulsed light source can be evaluated in the comparison of the second image parameter with a predetermined criterion and result in the detection of a pulsed light source. The predetermined criterion can be determined using the first image parameter and/or the predetermined value. The predetermined criterion can be determined using the first exposure time and the second exposure time.

The detection of pulsed light sources is also increasingly gaining in importance due to the increased use of pulsed light sources, both in vehicle tail lights (and meanwhile also in front lights) and in variable message signs. The introduced method allows light objects to be correctly tracked over the time, with changes in brightness of light objects being exhibited over the time. The detection of pulsed light sources is used for the processing algorithms. It is also favorable to decide whether, for example, the light object involves a turn signal or a tail light. The introduced method allows the resulting pattern of pulsed light sources, such as continuously luminous LED light sources, to be distinguished from the pulse repetition rate of a turn signal. In imaging systems, the flickering would have a disruptive effect on the driver since it would not be comprehensible for the driver based on the scene alone. All addressed points may be eliminated in the different specific embodiments.

In an example embodiment, the predetermined criterion can be determined in the step of evaluating using the first image parameter, and the predetermined criterion can be met in the step of evaluating when the at least second image parameter differs from the first image parameter, taking the first exposure time and the second exposure time into consideration. With a longer exposure time, a longer activation duration of the pulsed light source, in relative terms, can be detected than during a shorter exposure time. When the exposure time is cut in half, half the light should be detected with a constant light source, i.e., there can be a direct relation of the exposure time and the image parameter where the detector unit is reset to the same value prior to the two exposures. The relation may be changed and evaluated in the case of a pulsed light source.

It is also favorable when, in an example embodiment, the predetermined criterion is determined in the step of evaluating using the predetermined value to which the detector unit is reset, and the predetermined criterion is met in the step of evaluating when the second image parameter coincides with the predetermined value. Between the detection of the at least two image parameters, the detector unit can be reset to a value, which does not correspond to the starting value, the detector unit only being resettable to the predetermined value if the first image parameter has detected sufficient light, or if the first image parameter has exceeded a threshold value. In this embodiment, the second image parameter may correspond to a predetermined value to which the detector unit was reset. This embodiment can be used particularly favorably in a detector unit with at least one full reset, i.e., resetting to the same value prior to the detection of one image parameter, or of all image parameters.

In an example embodiment, the step of evaluating can be carried out simultaneously with the step of detecting. Conducting the step of evaluating simultaneously or in parallel with the step of detecting can particularly advantageously be carried out in a detector unit with at least one full reset. It is advantageous if a result is made available quickly, or if a pulsed light source is detected more quickly than the steps are able to be carried out sequentially one after the other.

Moreover, the at least second image parameter can be evaluated in the step of evaluating using at least one further image parameter, which was detected chronologically prior (i.e., preceding). The robustness of the method can be increased by a plurality of image parameters, which are detected using different exposure times in each case. A third image parameter, a fourth image parameter, a fifth image parameter, a sixth image parameter, a seventh image parameter, an eighth image parameter, and/or a ninth image parameter can be detected and/or evaluated. A plurality of consecutive image parameters of greater than nine may also be advantageous. Each image parameter of an image sequence can be detected using an exposure time that is different from the exposure times of the other image parameters of the same image sequence. By increasing the number of detected and evaluated image parameters of an image sequence, it is possible to improve the robustness of the method.

According to a particularly advantageous example embodiment, at least one further image parameter of the light of the light source is detected in the step of detecting, the further image parameter representing a location situated adjacent to the location that is represented by the first and/or second image parameter(s), and the at least second image parameter is evaluated in the step of evaluating using the further image parameter. A resolution of the detector unit can be selected in such a way that a pulsed light source is detectable by at least two adjacent pixels. Expanding the method to at least one adjacent pixel may facilitate the detection of a pulsed light source or improve the robustness of the method. In an example embodiment, a plurality of image parameters of the light of the light source adjacent to the first image parameter and the at least second image parameter are detected in the step of detecting, and the at least second image parameter is evaluated in the step of evaluating using the plurality of adjacent image parameters.

According to an example embodiment, at least one further image parameter of the light of the light source is detectable in the step of detecting, the further image parameter being recorded at a location situated adjacent to the location at which the first image parameter is recorded, the first image parameter and/or the at least one further image parameter being detected using at least one filter. A filter, in particular a color filter, on the detector unit can facilitate the evaluation. In an example embodiment, one pixel of the detector unit is not provided with a filter, while an adjacent pixel of the detector unit is provided with a color filter, for example, a red filter. In the step of evaluating, the image parameter detected with a filter and the adjacent image parameter detected without a filter can be evaluated. Having knowledge of the effects of a pulsed light source on the detector unit, which is provided at least partially with a filter, it is possible to evaluate a further indication of a pulsed light source.

In particular, the first image parameter and the at least second image parameter can be detected in the step of detecting using a first filter, and the at least one further image parameter can be detected in the step of detecting using an at least second filter that is different from the first filter. The first filter and the at least second filter, which is different from the first filter, can be different color filters. In this specific embodiment, the detector unit can be a Bayer sensor.

It is advantageous that a general extension of the integration time is avoidable with the described method. It is advantageous that the integration time does not have to be increased so much that large areas of the image would go into saturation. In particular, it is not known in advance whether pulsed light sources are in fact present in a scene. One specific embodiment corresponding to the introduced method allows for the integration time not to be continuously increased, and supports the need for an increase in the dynamic range.

The introduced method advantageously solves the challenge of analyzing the change in brightness of light objects over the time, without requiring a large number of frames or image cycles for an analysis, since the downstream functions require the correct classification of light objects after only very few individual images. One aspect of the present invention is to be able to provide information after only a single frame (or after very few frames) on whether or not the observed light source is pulsed.

The present invention further creates a device which includes units designed to carry out or implement the steps of the method introduced here in corresponding units. The approach introduced here can also be achieved quickly and efficiently by this embodiment variant of the present invention in the form of a device.

According to an example embodiment, the device is an electrical device that processes sensor signals and outputs control signals and/or data signals as a function thereof. The device can include an interface, which can be designed as hardware and/or software. In the case of a hardware design, the interfaces can, for example, be part of a so-called system ASIC, which includes a wide variety of functions of the device. However, it is also possible for the interfaces to be dedicated integrated circuits, or to be at least partially made up of discrete components. In the case of a software design, the interfaces can be software modules that are present on a microcontroller, for example, in addition to other software modules.

In addition, a computer program product is advantageous, which produce includes program code stored on a machine-readable carrier, such as a semiconductor memory, a hard disk memory, or an optical memory, and which is used to carry out the method according to one of the example embodiments described herein, if the program product is executed on a computer or a device.

The present invention is described in greater detail hereafter based on the accompanying drawings by way of example. In the following description of example embodiments of the present invention, identical or similar reference numerals are used for similarly acting elements shown in the different figures, and a repeated description of those elements is dispensed with.

DETAILED DESCRIPTION

Figure 1:
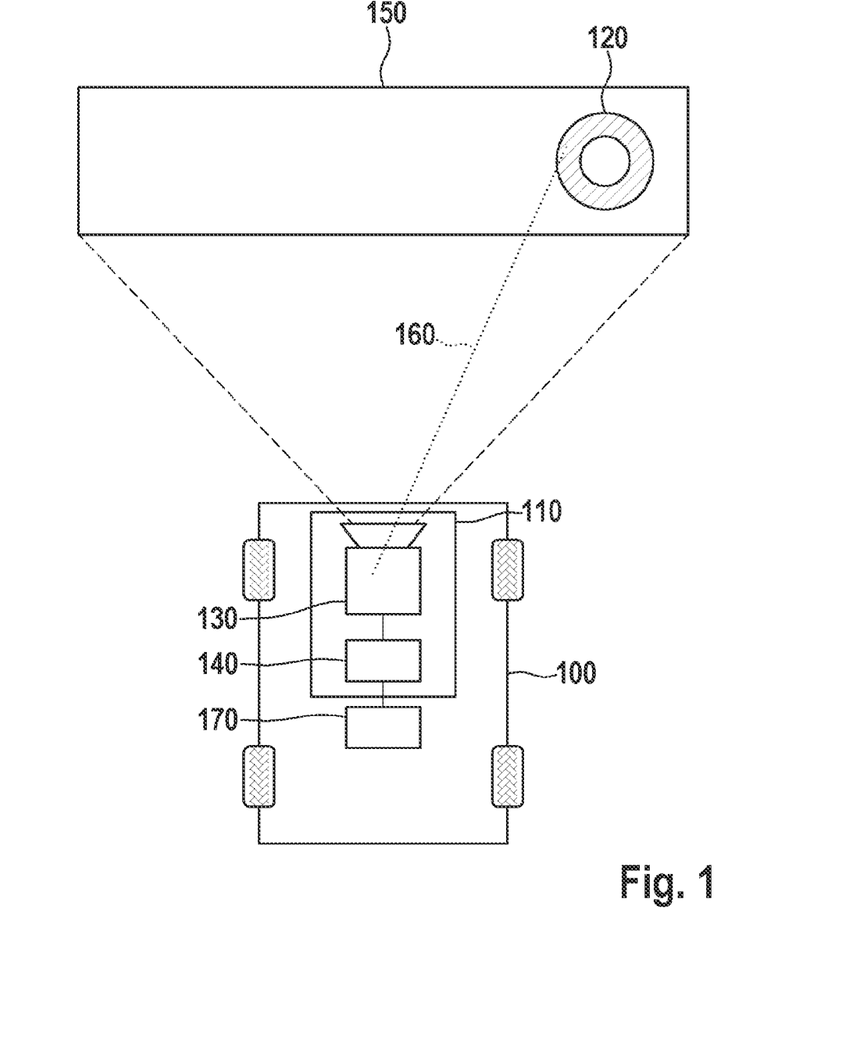
FIG. 1 shows a schematic illustration of a vehicle with a device for detecting at least one pulsed light source, according to an example embodiment of the present invention.

FIG. 1 shows a schematic illustration of a vehicle 100 including a device 110 for detecting at least one pulsed light source 120, according to an example embodiment of the present invention. The device 110 for detecting at least one pulsed light source 120 is situated in a vehicle 100, an includes a detector unit 130 and an evaluation unit 140. Detector unit 130 is designed as a camera system, and to detect a light emitted by pulsed light source 120 and create a depiction of the real surroundings or of the light of light source 150. In the shown example embodiment, the light of light source 150 includes a pulsed light source 120. Detector unit 130 is designed to detect an image parameter 160, which represents a physical variable detected in a pixel of detector unit 130, such as a voltage, which represents a gray scale value, an intensity, a color shade, a color value, a color saturation, a lightness value, a brightness, and/or a light intensity of the light of light source 150. As described, FIG. 1 includes a pulsed light source 120, which is designed as a variable message sign. For this purpose, pulsed light source 120 includes a plurality of light sources, which are designed as light-emitting diodes and which are operated in a periodically pulsed manner. This means that the light-emitting diodes of pulsed light source 120 are periodically in an on-phase and periodically in an off-phase. Device 110 for detecting at least one pulsed light source 120 is connected to a driver assistance system 170.

Figure 2:
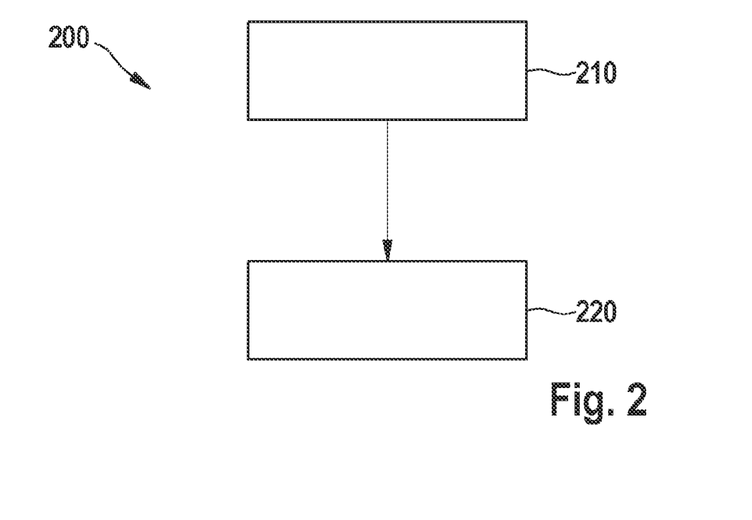
FIG. 2 is a flowchart of a method for detecting at least one pulsed light source, according to an example embodiment of the present invention.

FIG. 2 shows a flowchart of a method 200 for detecting at least one pulsed light source 120, according to an example embodiment of the present invention. Method 200 for detecting at least one pulsed light source includes at least a detection step 210 and evaluation step 220. In the detection step 210, a first image parameter of the light of the light source is detected using a first exposure time, and a second image parameter of the light of the light source is detected using an at least second exposure time, the first exposure time and the at least second exposure time being different, and the detector unit being set to a predetermined value between the detection of the first image parameter and the detection of the at least second image parameter, the first image parameter and the at least second image parameter chronologically consecutively representing the same spatial location. In the evaluation step 220, the at least second image parameter is evaluated to detect a pulsed light source and whether the at least second image parameter meets a predetermined criterion is evaluated.

The diagrams in FIGS. 3-9 show the operating mode of device 110 for detecting pulsed light sources 120 according to example embodiments of the present invention, whereby the operating mode is explained in greater detail.

Figure 3:
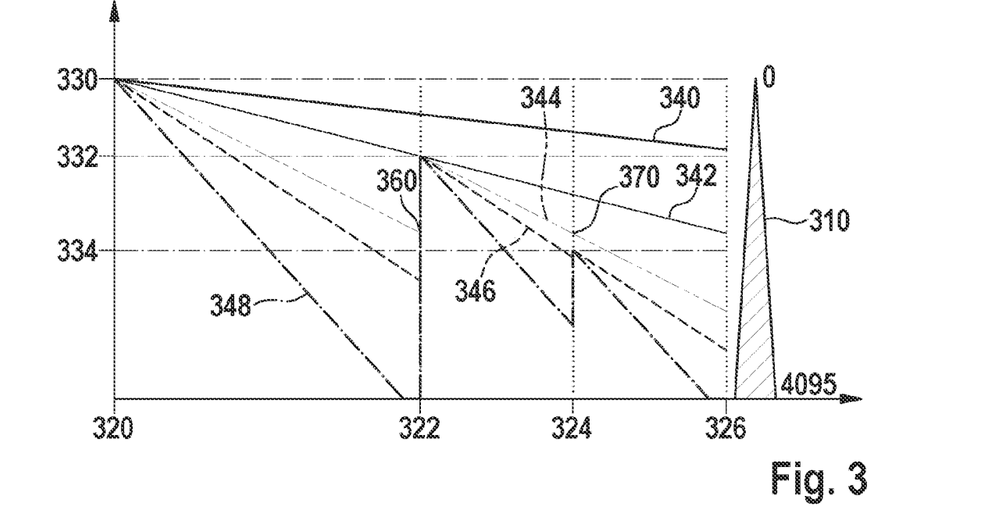
FIG. 3 shows a diagram with five exposure curves of a detector unit with a piecewise linear characteristic curve and a partial reset, according to an example embodiment of the present invention.

The diagram in FIG. 3 shows five exposure curves of a detector unit with a piecewise linear characteristic curve and a partial reset, according to an example embodiment of the present invention. In a Cartesian coordinate system, the exposure time is plotted on the x-axis and a voltage value is plotted on the y-axis, the voltage value representing a light intensity, a gray scale value, an intensity, a color shade, a color value, a color saturation, a lightness value, and/or a brightness. In the particular diagram shown in FIG. 3, the voltage represents a gray scale value, the voltage at the beginning of an exposure representing black, and representing white when the voltage drops down to the x-axis, with corresponding gray scale values between these two extremes. The voltage value can be indicated digitally. In this example embodiment, white is indicated by the value 0 and black is indicated by the value 4095, or the gray scale value is represented with an accuracy of 12 bits ($2^{12}$=4096). This is represented on the right side of the shown diagram with a gray scale value arrow 310. The diagram shows the recording or detecting, exposure or integration of five light sources, i.e., five light sources with different lightness levels are detected using five different pixels of a detector unit, and the corresponding five exposure curves 340, 342, 344, 346, 348 are shown.

The exposure or integration begins at a first point in time 320. At a second point in time 322, which in the illustrated example embodiment is six milliseconds after first point in time 320, the pixels whose exposure curves have exceeded or dropped below a predetermined threshold value 332, i.e., a gray scale value which was too light or which was white has been detected as first image parameter 360 or the pixel of the detector unit went into saturation, are partially reset to predetermined threshold value 332, in the diagram the corresponding exposure curve also assuming the predetermined threshold value as the new value at the second point in time. The exposure time or the integration time continues until a third point in time 324, at which the pixels that have exceeded a further predetermined threshold value 334 are again partially reset. At the third point in time, a second exposure value 370 is detected for each exposure curve. In the shown example embodiment, third point in time 324 is nine milliseconds after first point in time 320, or three milliseconds after second point in time 322. The exposure or integration is continued until point in time of reading out 326, which in the shown example embodiment is three milliseconds after the third point in time, or twelve milliseconds after the first point in time. At second point in time 322, exposure curves 340, 342 of two light sources have not exceeded predetermined threshold value 332, and the corresponding pixels of the detector unit are not reset. Exposure curves 344, 346, 348 of the three further light sources have exceeded predetermined threshold value 332 at second point in time 322, and are accordingly partially reset to predetermined threshold value 332. At third point in time 324, exposure curves 346, 348 exceed further predetermined threshold value 334 and are reset to further predetermined threshold value 334. At point in time of reading out 326, the image parameters of exposure curves 340, 342, 344, 346, 348 are read out. The image parameter of exposure curve 348 is in saturation. A detection using a detector unit with a piecewise linear characteristic curve as shown in FIG. 3 compresses higher intensities more strongly and allows a higher dynamic range to be depicted. Due to the stronger compression of higher intensities, an image or an image parameter goes into saturation later. In the shown example embodiment, a partial reset is carried out twice. In other example embodiments, which are not shown, a partial reset is carried out only once and/or multiple resets are carried out, for example nine.

Figure 4:
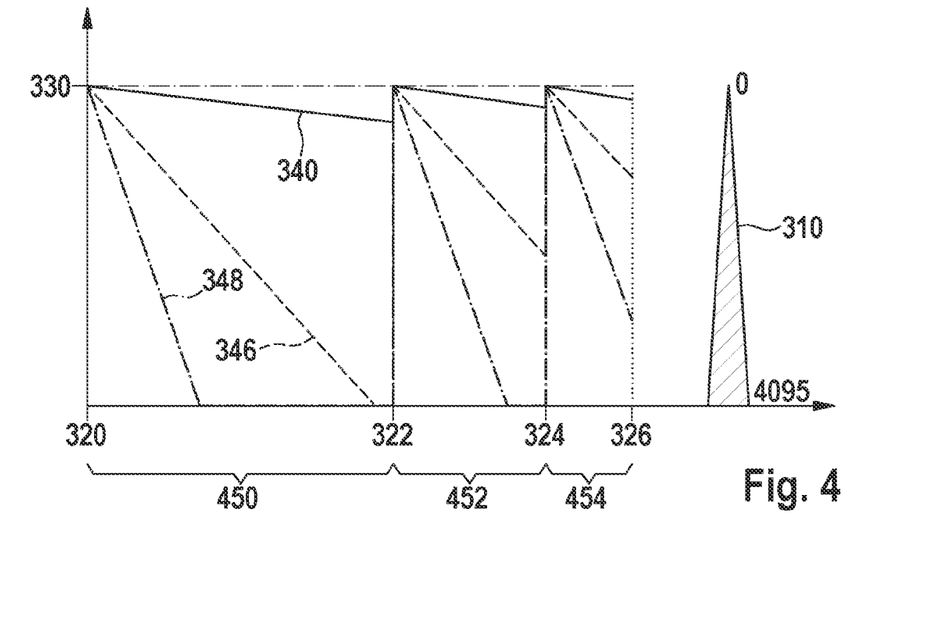
FIG. 4 shows a diagram with three exposure curves of a detector unit with a piecewise linear characteristic curve and a full reset, according to an example embodiment of the present invention

The diagram in FIG. 4 shows three exposure curves of a detector unit with a piecewise linear characteristic curve and a full reset, according to an example embodiment of the present invention. As is shown in FIG. 4, a full reset results in an exposure bracketing with differently long exposure times. Contrary to the illustration in FIG. 3, the detector unit is not partially but fully reset at second point in time 322 and at third point in time 324. The final gray scale value in this type of detector unit is usually determined on every pixel by selecting the first non-saturated exposure curve or voltage. A first exposure time 450 of twelve milliseconds, for example, is obtained between first point in time 320 and second point in time 322. A second exposure time 452 of six milliseconds, for example, is obtained between second point in time 322 and third point in time 324. A third exposure time 452 of three milliseconds, for example, is obtained between third point in time 324 and point in time of reading out 326. The diagram shows the recording of three exposure curves 340, 346, 348, i.e., three light sources with different lightness levels are detected using three different pixels of a detector unit. The exposure or integration begins at a first point in time 320. After first exposure time 450, the two exposure curves 346, 348 have resulted in a saturation during the detection of the image parameters. In second exposure time 452, which has been cut in half, exposure curve 348 still results in saturation. In the present example, longest integration time 450 has been selected for exposure curve 340 of the first light source, average integration 452 has been selected for the second light source or for exposure curve 346 representing the same, and shortest integration time 454 has been selected for the third light source or exposure curve 348 representing the same. It is interesting that a certain redundancy exists here—for example, the second light source could be represented both by average integration time 452 and by shortest integration time 454—in this case, usually average integration time 452 is selected since this results in a better signal-to-noise ratio. Constant light sources are assumed for exposure curves 340, 346, 348 shown in FIG. 4. In the shown example embodiment, an image sequence is recorded using three different exposure times. In further example embodiments, which are not shown, only two different exposure times are recorded and/or an image sequence is recorded using a plurality of different exposure times, for example five, nine, or fifteen different exposure times. In a sequence of different exposure times, the subsequent exposure time may be half as long as the preceding exposure time in an example embodiment.

Figure 5:
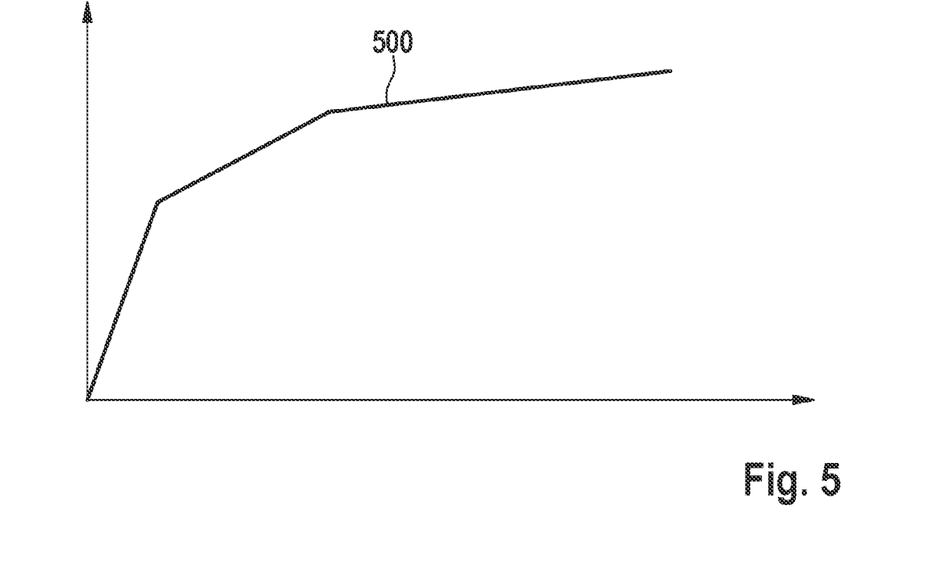
FIG. 5 shows a diagram of a piecewise linear characteristic curve of the conversion of real brightness values into gray scale values in an image, according to an example embodiment of the present invention.

The diagram of FIG. 5 shows a piecewise linear characteristic curve of the conversion of real brightness values into gray scale values in an image, according to an example embodiment of the present invention. In a Cartesian coordinate system, real brightness values are shown on the x-axis and gray scale values in a recorded image are shown on the y-axis. Piecewise linear characteristic curve 500 has breakpoints due to the partial and/or full reset of the detector unit. In the hardware strategies shown in FIGS. 3 and 4, the mapping between brightness levels in the real space environment and gray scale values in the image, as shown in FIG. 5, is present. In FIG. 3, a full reset (here at 12 ms) and 2 partial resets (at 6 ms and 3 ms) are assumed, and in FIG. 4, 3 full resets (at 12 ms, 6 ms, and 3 ms) are assumed. In reality, up to 9 partial resets are supported today.

Figure 6A:
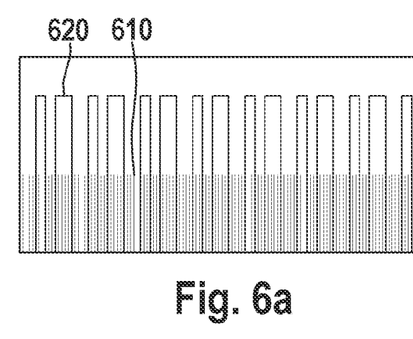
FIGS. 6a and 6b each shows a diagram of the relation of the pulse repetition rate of pulsed light sources and the exposure time of a detector unit, according to an example embodiment of the present invention.
Figure 6B:
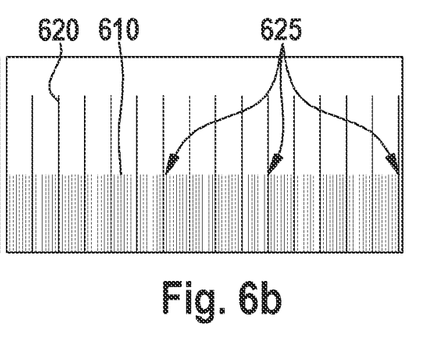

FIGS. 6a and 6b each shows a diagram of the relation of the pulse repetition rate of pulsed light sources and the exposure time of a detector unit, according to an example embodiment of the present invention. Depending on the relation of the exposure time and the pulse repetition rate of the pulsed light sources (LEDs), the light sources either change their brightness over the time (FIG. 6a), or are not visible at all in individual frames (FIG. 6b), in the image detected by the detector unit. In a Cartesian coordinate system, the time is shown on the x-axis and an intensity is shown on the y-axis. Light pulses 610 of the periodically pulsed light sources in this example embodiment have a repetition rate of 200 Hz, at a duty cycle of 20%, the duty cycle indicating the ratio of the pulse duration to the period duration. In FIG. 6a, integration time 620 or exposure time 620 of the detector unit is alternately 12 milliseconds and 22 milliseconds. The figure shows that the number of detected light pulses 610 varies at the same integration time 620. FIG. 6b shows a much shorter integration time of only one millisecond. Here, only three light pulses 625 of light pulses 620 of the pulsed light source are detected. FIG. 6a shows an exemplary embodiment at night, and FIG. 6b shows an exemplary embodiment during the day. In other words, in FIG. 6a, the integration time of the detector unit (of the imager) at night is 12 ms and 22 ms at a pulse repetition rate of the LEDs of 200 Hz here, and a duty cycle of 20%. In FIG. 6b, the integration time of the detector unit (of the imager) is 1 ms during the day, by way of example, at an unchanged pulse repetition rate of the LEDs of 200 Hz at a duty cycle of 20%.

Figure 7:
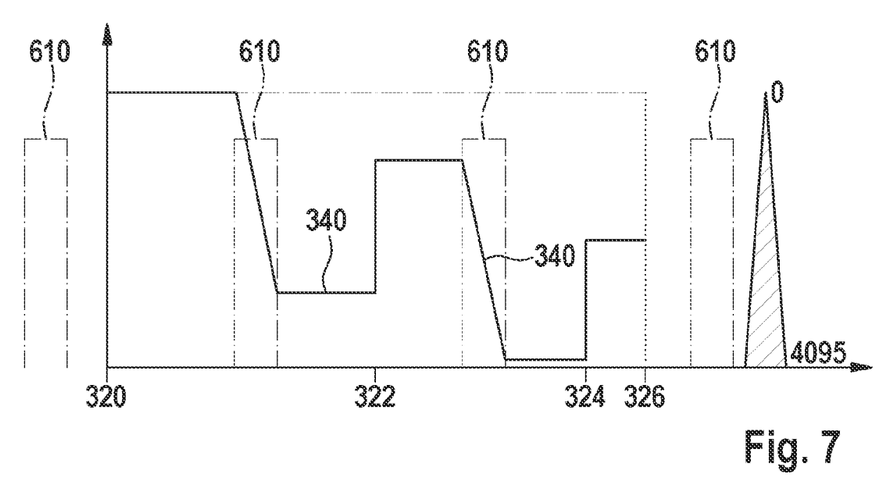
FIG. 7 shows a diagram with five exposure curves of a detector unit with a piecewise linear characteristic curve and a partial reset, according to an example embodiment of the present invention.

FIG. 7 shows a diagram with five exposure curves of a detector unit with a piecewise linear characteristic curve and a partial reset, according to an example embodiment of the present invention. The basic design of FIG. 7 largely corresponds to FIG. 3, but, contrary to FIG. 3, a pulsed light source is detected. The diagram shows light pulses 610 of a periodically pulsed light source. In a Cartesian coordinate system, the exposure time is plotted on the x-axis and a voltage value is plotted on the y-axis, the voltage value in this example embodiment representing a gray scale value, the voltage at the beginning of an exposure representing black, and representing white when the voltage drops to the x-axis, with corresponding gray scale values between these two extremes. The detection of a light source, whose exposure curve 340 is plotted in the diagram, starts at a first point in time 320, the gray scale value of the light source detected by exposure curve 340 representing a result of the non-constant exposure with the aid of a light pulse 610 of a pulsed light source. Exposure during the integration time only takes place during the pulse duration of the light pulse 610, the first integration time lasting from first point in time 320 to second point in time 322. A partial reset takes place at second point in time 322, since the detected gray scale value of the light source shown in exposure curve 340 has exceeded a predefined threshold value. During the second integration time, between second point in time 322 and third point in time 324, another exposure takes place during the pulse duration of light pulse 610, a saturation of exposure curve 340 being reached. Another partial reset takes place at third point in time 324, since the detected gray scale value of the light source has exceeded the further predefined threshold value by reaching saturation. The value of exposure curve 340 does not change between third point in time 324 and point in time of reading out 326, since no light pulse 610 falls into this time period. At point in time of reading out 326, exposure curve 340 has a value which corresponds to the further threshold value at third point in time 324. This is an indication of the detection of a pulsed light source.

The depiction of a pulsed light source using a multilinear sensor with partial resets looks as shown in FIG. 7. It is apparent that a non-constant exposure over the integration time (triggered by pulsed light sources) causes the gray scale values within the light source to be (predominantly) situated exactly on the set breakpoints of the piecewise linear characteristic curve. The set camera characteristic curve or characteristic curve of the detector unit does not have to be varied—the usual settings (with which the best algorithmic performance is achieved) remain set. A downstream algorithm can evaluate the images and check whether the gray scale values within the analyzed light source coincide with one of the breakpoints. This is considerably more likely for pulsed light sources than for a non-pulsed light source. A spatial analysis (and, if necessary, an additional temporal analysis over few image sequences/frames) suffices to correctly classify the light sources as pulsed or not pulsed.

In addition, the color filters applied to the sensor may facilitate the evaluation. For example, if an R31 sensor is used (one red pixel, which allows only red light to pass, and 3 intensity pixels, which allow light of any wavelength to pass, in each case in a square adjacent arrangement of 4), then it is furthermore possible to analyze whether red and intensity pixels have the same intensities (red tail lights also typically radiate in frequency ranges which are attenuated by red filters). This would be an additional indication of a pulsed light source. One example is shown in the following FIG. 8. When using a Bayer sensor (RGGB), the corresponding results will be even better, since it is possible to compare three different color channels.

Figure 8:
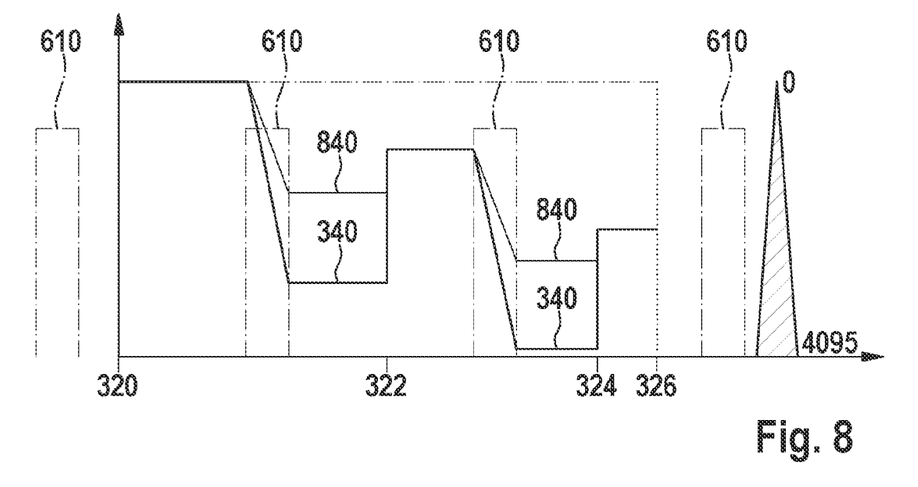
FIG. 8 shows a diagram with five exposure curves of a detector unit with a piecewise linear characteristic curve and a partial reset, according to an example embodiment of the present invention.

The diagram in FIG. 8 shows five exposure curves of a detector unit with a piecewise linear characteristic curve and a partial reset, according to an example embodiment of the present invention. FIG. 8 largely corresponds to FIG. 7, but, in addition to exposure curve 340, corresponding to an unfiltered signal of a light source, a further exposure curve 840 is shown, which is detected using a red filter on the detector unit. The red filter results in an attenuated signal, whereby assigned exposure curve 840 has a flatter progression. At second point in time 322 and at third point in time 324, the value of the two exposure curves 340, 840 in each case has exceeded the assigned predefined threshold value or the further predefined threshold value. At the point in time of reading out 326, the two exposure curves have the same gray scale value. In the case of a non-pulsed light source, the gray scale values of a light source detected with a filter and those of a light source detected without a filter would have to differ from each other. In other words, FIG. 8 shows how, by using filters in the detector unit, the detection of pulsed light sources can be advantageously improved.

Figure 9:
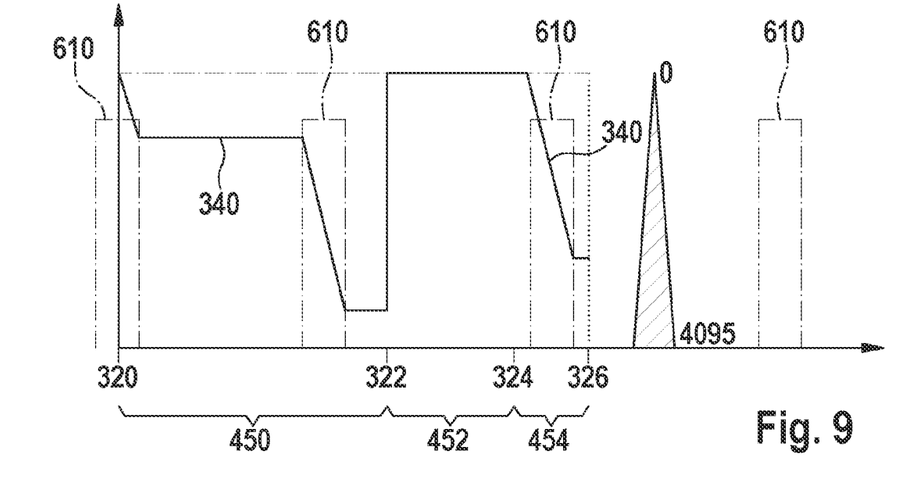
FIG. 9 shows a diagram with three exposure curves of a detector unit with a piecewise linear characteristic curve and a full reset, according to an example embodiment of the present invention.

The diagram in FIG. 9 shows three exposure curves of a detector unit with a piecewise linear characteristic curve and a full reset, according to an example embodiment of the present invention. The basic design of FIG. 9 largely corresponds to FIG. 4, but, contrary to FIG. 4, a pulsed light source is detected. In a Cartesian coordinate system, the time is plotted on the x-axis and a voltage is plotted on the y-axis. An exposure curve 340 represents the detected gray scale value of a pulsed light source over the time. A first exposure time 450 of six milliseconds, for example, is obtained between first point in time 320 and second point in time 322. A second exposure time 452 of four and a half milliseconds, for example, is obtained between second point in time 322 and third point in time 324. A third exposure time 452 of one and a half milliseconds, for example, is obtained between third point in time 324 and point in time of reading out 326. The diagram shows the recording of an exposure curve 340, which detects light pulses 610 of a pulsed light source. The exposure or integration begins at a first point in time 320. A portion of a light pulse 610 and a complete light pulse 610 fall into first exposure time 450. Toward the end of first exposure time 450, exposure curve 340 has not reached saturation. The detector unit is fully reset at second point in time 322. None of light pulses 610 falls into second exposure time 452, and the exposure curve remains constant at the value after the detector unit has been reset. Another complete light pulse 610, whose detection is reflected in exposure curve 340, falls into third exposure time 454. In the case of a constant light source, the value of exposure curve 340 toward the end of exposure time 450, 452, 454 should be relative to the duration of exposure time 450, 452, 454, i.e., an information redundancy is encountered. In the shown example embodiment, the detected gray scale values are not in any relation to exposure time 450, 452, 454, which allows a pulsed light source to be inferred.

In other words, it is possible to distinguish pulsed light sources from non-pulsed light sources even in the case of a detector unit (an imager) with multiple full resets, i.e., complete resetting, when using suitable measures. The redundancy of the information addressed above is utilized for this purpose. According to the procedure described with respect to FIG. 4, the output voltage generated by first integration time 450 would be used to generate a gray scale value on the present pixel, and the other two voltages would simply be discarded. It is apparent from the diagram, however, that, in the present case, the evaluation of the two additional voltages allows a pulsed/non-pulsed classification of the associated light source. A suitable algorithm will classify a light spot as "pulsed" when, in the present case (integration time corresponding to a full reset of the detector unit at 12 ms, 6 ms, and 3 ms), the voltage at point in time of reading out 326 is not half as great as the voltage at the third point in time, and the latter voltage is not half as great as the voltage of exposure curve 340 at the second point in time. This algorithm may be implemented by a simple logic circuit on an FPGA directly in the detector unit, i.e., the imager FPGA.

If it is was detected that the present instance involves a pulsed light source, it is possible in processing steps, for example, to appropriately parameterize the tracking algorithms which are used or to update (maximal) gray scale values over the time for certain image areas (to generate a visually more appealing image). Another option is to switch the exposure control to a targeted overexposure in the case of detected pulsed light sources in the scene (to improve the readability of pulsed variable message signs, for example).

The multiple exposure times within an exposure cycle are used to detect whether a light source is a pulsed light source. This takes place by analyzing the gray scale values. For this purpose, the entire exposure time does not necessarily have to be greater than the time duration of the off-phase of the pulsed light source, since in almost all cases this would generate a highly overexposed image. The introduced method is not able to ensure at all times that the pulsed light source is visible in every single frame. It may therefore be advantageous to carry out the introduced method multiple times to more reliably detect a pulsed light source. It is advantageous that the exposure control does not have to be adjusted, and thus a better corrected raw image is available, which may be processed better with the aid of appropriate algorithms than partially overexposed raw images.

The described example embodiments shown in the figures are selected only by way of example. Different example embodiments may be combined with each other completely or with respect to individual features. It is also possible to supplement one example embodiment with features of another example embodiment.

Moreover, method steps according to the present invention may be carried out repeatedly and in a different order than that which has been described.

If an example embodiment includes an "and/or" link between a first feature and a second feature, this should be read in such a way that the example embodiment according to one specific embodiment includes both the first feature and the second feature, and according to an another specific embodiment includes either only the first feature or only the second feature.

What is claimed is:

1. A method comprising:
    detecting, by a detector unit, a first image parameter of light emitted by a pulsed light source using a first exposure time;
    detecting, by the detector unit, at least one second image parameter of the light of the light source using at least one second exposure time that is different than the first exposure time, wherein the first image parameter and the at least one second image parameter represent a same spatial location at consecutive times;
    setting, by processing circuitry, the detector unit to a predetermined value between the detection of the first image parameter and the detection of the at least one second image parameter;
    evaluating, by the processing circuitry, the at least one second image parameter to detect a pulsed light source when the at least one second image parameter meets a predetermined criterion; and
    determining the predetermined criterion based on a predetermined value to which the detector unit is reset, wherein the predetermined criterion is met in the evaluating step when the at least one second image parameter coincides with the predetermined value.

2. The method of claim 1, further comprising determining the predetermined criterion based on the first image parameter, wherein the predetermined criterion is met in the evaluating step when the at least one second image parameter differs from the first image parameter.

3. The method of claim 1, further comprising determining the predetermined criterion based on the first image parameter, wherein the predetermined criterion is met in the evaluating step when the at least one second image parameter differs from the first image parameter, taking into consideration the first exposure time and the second exposure time.

4. The method of claim 1, wherein the evaluating step is carried out simultaneously with the step of detecting the at least one second image parameter.

5. The method of claim 1, wherein, in the evaluating step, the at least one second image parameter is evaluated using based on at least one image parameter detected prior to the detection of the at least one second image parameter.

6. A method comprising:
    detecting, by a detector unit, a first image parameter of light emitted by a pulsed light source using a first exposure time;
    detecting, by the detector unit, at least one second image parameter of the light of the light source using at least one second exposure time that is different than the first exposure time, wherein the first image parameter and the at least one second image parameter represent a same spatial location at consecutive times;

setting, by processing circuitry, the detector unit to a predetermined value between the detection of the first image parameter and the detection of the at least one second image parameter;

evaluating, by the processing circuitry, the at least one second image parameter to detect a pulsed light source when the at least one second image parameter meets a predetermined criterion; and detecting at least one further image parameter of the light of the light source, wherein the further image parameter represents a spatial location situated adjacent to the spatial location that is represented by the first and at least one second image parameters, and the evaluation of the at least second image parameter is based on the further image parameter.

7. A method comprising:

detecting, by a detector unit, a first image parameter of light emitted by a pulsed light source using a first exposure time;

detecting, by the detector unit, at least one second image parameter of the light of the light source using at least one second exposure time that is different than the first exposure time, wherein the first image parameter and the at least one second image parameter represent a same spatial location at consecutive times;

setting, by processing circuitry, the detector unit to a predetermined value between the detection of the first image parameter and the detection of the at least one second image parameter;

evaluating, by the processing circuitry, the at least one second image parameter to detect a pulsed light source when the at least one second image parameter meets a predetermined criterion; and detecting at least one further image parameter of the light of the light source, wherein the further image parameter and the first image parameter are recorded at adjacent locations, and at least one of the first image parameter and the at least one further image parameter is detected using at least one filter.

8. The method of claim 7, wherein the detections of the first image parameter and the at least one second image parameter are performed using a first filter, and the detection of the at least one further image parameter is performed using an at least second filter which is different from the first filter.

9. A system comprising:
a detector; and
processing circuitry;

wherein:
the detector is configured to detect a first image parameter of light emitted by a pulsed light source using a first exposure time, and to detect at least one second image parameter of the light of the light source using at least one second exposure time that is different than the first exposure time;

the first image parameter and the at least one second image parameter represent a same spatial location at consecutive times; and the processing circuitry is configured to set the detector to a predetermined value between the detection of the first image parameter and the detection of the at least one second image parameter, and to evaluate the at least one second image parameter to detect a pulsed light source when the at least one second image parameter meets a predetermined criterion, wherein the predetermined criterion is determined based on a predetermined value to which the detector is reset, wherein the predetermined criterion is met in the evaluating when the at least one second image parameter coincides with the predetermined value.

10. A non-transitory computer-readable medium on which there are stored instructions that are executable by a processor, the instructions which, when executed by the processor, cause the processor to perform a method, the method comprising:

obtaining from a detector unit a first image parameter of light emitted by a pulsed light source, detected by the detector unit using a first exposure time;

obtaining from the detector unit at least one second image parameter of the light of the light source, detected by the detector unit using at least one second exposure time that is different than the first exposure time, wherein the first image parameter and the at least one second image parameter represent a same spatial location at consecutive times;

setting the detector unit to a predetermined value between the detection of the first image parameter and the detection of the at least one second image parameter;

evaluating the at least one second image parameter to detect a pulsed light source when the at least one second image parameter meets a predetermined criterion; and determining the predetermined criterion based on a predetermined value to which the detector unit is reset, wherein the predetermined criterion is met in the evaluating step when the at least one second image parameter coincides with the predetermined value.

* * * * *